(12) United States Patent
Bagyánszky

(10) Patent No.: US 11,975,338 B2
(45) Date of Patent: May 7, 2024

(54) APPARATUS FOR MAGNETIC TREATMENT OF FLUIDS

(71) Applicant: EVOLUTIONWATER KFT., Alsózsolca (HU)

(72) Inventor: Gábor Bagyánszky, Budapest (HU)

(73) Assignee: Evolution Water Kft., Alsózsolca (HU)

( * ) Notice: Subject to any disclaimer, the term of this patent is extended or adjusted under 35 U.S.C. 154(b) by 768 days.

(21) Appl. No.: 17/054,603

(22) PCT Filed: May 8, 2019

(86) PCT No.: PCT/HU2019/050020
§ 371 (c)(1),
(2) Date: Nov. 11, 2020

(87) PCT Pub. No.: WO2019/215465
PCT Pub. Date: Nov. 14, 2019

(65) Prior Publication Data
US 2021/0178402 A1    Jun. 17, 2021

(30) Foreign Application Priority Data
May 11, 2018    (HU) .................................. U1800079

(51) Int. Cl.
*B03C 1/28*    (2006.01)
*B03C 1/14*    (2006.01)
*C02F 1/48*    (2023.01)

(52) U.S. Cl.
CPC ............. *B03C 1/288* (2013.01); *B03C 1/14* (2013.01); *C02F 1/482* (2013.01); *C02F 1/485* (2013.01);
(Continued)

(58) Field of Classification Search
None
See application file for complete search history.

(56) References Cited

U.S. PATENT DOCUMENTS 4,502,958 A * 3/1985 Sasaki .................... B03C 1/286
                                                         210/695
5,882,514 A * 3/1999 Fletcher ................. F02M 27/02
                                                         422/186.01
(Continued)

*Primary Examiner* — Brian W Cohen
(74) *Attorney, Agent, or Firm* — Jason D. Voight

(57) ABSTRACT

The object of the invention is an apparatus (50) for magnetic treatment of fluids, comprising a substantially cylindrical housing (6), having a bottom wall (61), a top wall (62), and a sidewall (60) running around the circumference of the bottom wall (61) and of the top wall (62) of the housing; at least one inlet opening (2, 3) and at least one outlet opening (4) formed in a wall of the housing (6); at least one magnet (8) connected to the housing (6), wherein the magnetic field of the magnet intrudes into the housing; wherein one or more inlet tubes (30) are connected to the one or more inlet openings (2, 3), wherein the inlet tubes are at least partially tangential at least in the proximity of the inlet opening. As a result of this configuration, the velocity vector of the fluid to be treated has a significant tangential component during most of its travel through the apparatus and thus the fluid crosses the magnetic field lines of the magnets having their magnetic axes oriented parallel with the centerline of the housing such that the angle formed between said field lines and said velocity vector is large.

13 Claims, 3 Drawing Sheets

Figure 1:
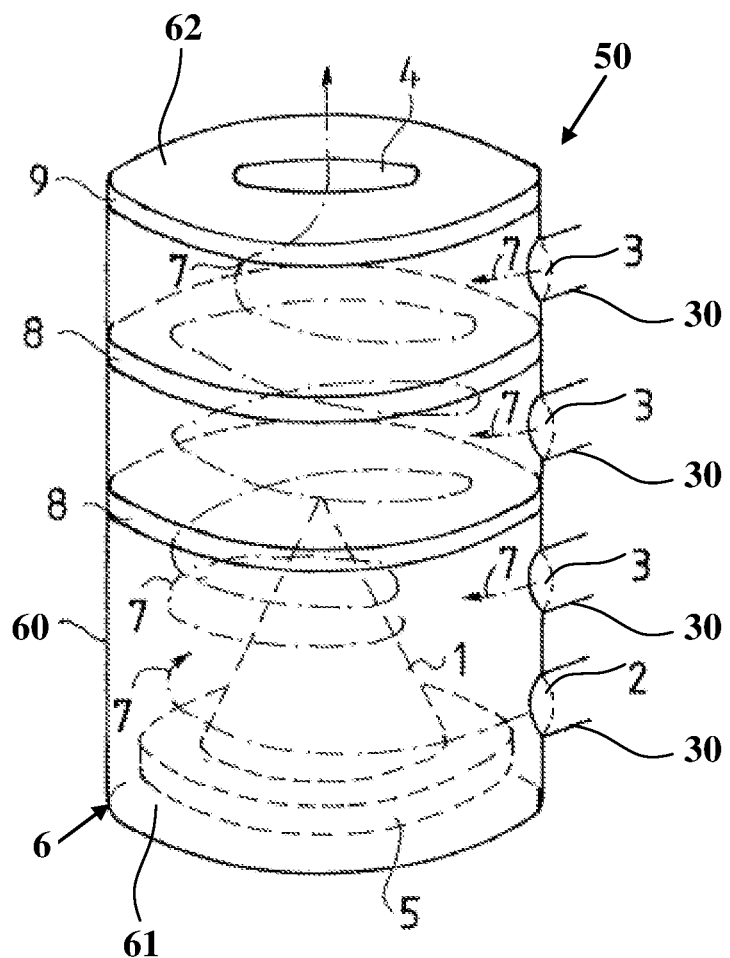

(52) U.S. Cl.
CPC ...... *B03C 2201/16* (2013.01); *B03C 2201/18* (2013.01); *C02F 2201/004* (2013.01); *C02F 2301/026* (2013.01); *C02F 2303/22* (2013.01)

(56) References Cited

U.S. PATENT DOCUMENTS

| | | | |
|---|---|---|---|
| 2014/0262826 A1* | 9/2014 | Rao | C02F 9/00 204/664 |
| 2015/0298139 A1* | 10/2015 | Wilkes | B03C 1/288 96/2 |

* cited by examiner

APPARATUS FOR MAGNETIC TREATMENT OF FLUIDS

This is the national stage of International Application PCT/HU2019/050020, filed May 8, 2019.

The object of the present invention is an apparatus for magnetic treatment of liquid and gaseous materials, which exposes a fluid to magnetic effects while the fluid flows through the apparatus.

The field of influencing the properties of different fluids by magnetic treatment of the fluids has been a matter of interest for a long time. Examples include the treatment of industrial water for reducing scaling, treatment of irrigation water or drinking water for achieving beneficial physiological effects, and treatment of fuel for positively influencing its combustion properties. A number of apparatuses are known for magnetic treatment of a fluid, i.e. for guiding said fluid through a magnetic field for achieving these goals.

European Publication Pamphlet No. EP0610142 discloses an apparatus for subjecting water flowing in a pipe to magnetic treatment by permanent magnets that can be fitted and fixed onto the pipe from the outside. The magnetic axis is substantially perpendicular to the pipe, parallel to a diameter thereof. A drawback of the apparatus is that the working area is quite small, the water flowing in the pipe is subjected to the effect of the magnets for only a very short duration, and thus the effect of the magnetic treatment is small even with the use of strong magnets.

Hungarian Patent No. HU 227 097 discloses an apparatus for magnetic treatment of fluids, comprising a substantially cylindrical housing made of magnetizable material, wherein a fluid passes through a flow space formed within the housing, and permanent magnets of annular, disc and conical shapes are arranged in said housing such that the fluid passes through passages formed in the middle of some of the magnets and through an annular space around some other magnets. The magnetic axes of the permanent magnets substantially coincide with the geometric axis of the housing. The flow of the fluid in the cylindrical apparatus is alternately axial and radial, and thus the length of the path of the fluid in the apparatus is larger than the axial size of the apparatus, but due to the configuration of the apparatus, the fluid is present in a sufficiently strong magnetic field only in a portion of said path, and in a large portion of the path the flow direction is not perpendicular to the magnetic field lines.

A common feature of the prior art apparatuses is that the material to be treated therein passes through the magnetic field in a relatively short path in a relatively short duration, and accordingly the magnetic treatment is not sufficient. Attempts for increasing the effect of treatment include increasing the strength of the magnetic field, increasing the size of the magnetic field (and thus of the working region) both by increasing the physical dimensions of the individual magnets and increasing the number of magnets. All of these solutions proportionally increase the production costs of the treatment apparatuses, i.e. cost-efficient production of a sufficiently effective apparatus is not possible by the prior art solutions.

The objective of the present invention is to eliminate or at least reduce the drawbacks of the prior art solutions by providing a magnetic fluid treatment apparatus that can be produced cost-efficiently and provides a large extent, effective magnetic treatment.

The interaction between the magnetic field and the material flowing in the magnetic field is obviously influenced by the strength of the magnetic field and the duration of the interaction. The strength of the magnetic field is determined by the strength of the magnet used and the distance therefrom. The duration of the interaction is determined by the volume of the space with the magnetic field (from now on: working region) and the flow rate at the working region, i.e. the volume of fluid passing through the working region per unit time. Accordingly, each of the prior art solutions intends to increase the efficacy of the treatment through one of these parameters.

The present invention is based in part on the recognition that the efficacy of the magnetic treatment may also be increased by forcing the fluid to be treated in a cylindrical flow space onto a circular path, which passes through as much magnetic flux lines in a large angle as possible, and thus the length of the path travelled by the fluid in sufficiently strong magnetic field can be increased severalfold. A further recognition forming the basis of the invention is that due to the longer flow path formed this way, for a given flow rate, the local flow velocity of the fluid can be higher and thus passing through a magnetic field of a given strength for a given period of time results in a greater extent of magnetic treatment.

Accordingly, the above objective was achieved by providing an apparatus for magnetic treatment of fluids, comprising a housing having a bottom wall, a top wall, and a sidewall running around the circumference of the bottom wall and the top wall of the housing, the housing having a centerline passing through the center of the bottom wall and the center of the top wall, at least one inlet opening and at least one outlet opening is formed in a wall of the housing, and at least one magnet is directly or indirectly connected to the wall of the housing such that its magnetic field intrudes into the housing, and at least one inlet tube is connected to the inlet opening, wherein at least one of the at least one inlet tubes is oriented substantially tangentially to the sidewall of the housing in the proximity of the inlet opening. The term "substantially tangential" orientation in the present description means, that in a sectional view perpendicular to the centerline, the inlet tube guides the fluid onto an inner surface of the sidewall with a minimal incidence angle. The terms "top" and "bottom" in the present description are always understood in the reference frame of the Figures in the orientation of the apparatus shown in the Figures, these terms do not imply the necessity of arranging the centerline of the apparatus vertically, neither do they imply the necessary orientation of the apparatus when arranged with a vertical centerline. The apparatus may also be used with its centerline arranged horizontally or in any other orientation. The bottom and top terms may also be understood as upstream side and downstream side respectively.

Preferred exemplary embodiments of the apparatus are set out herein.

Figure 2:
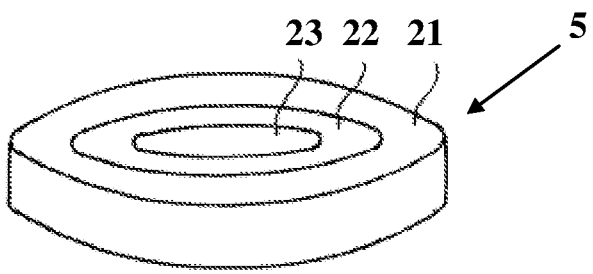
Figure 3:
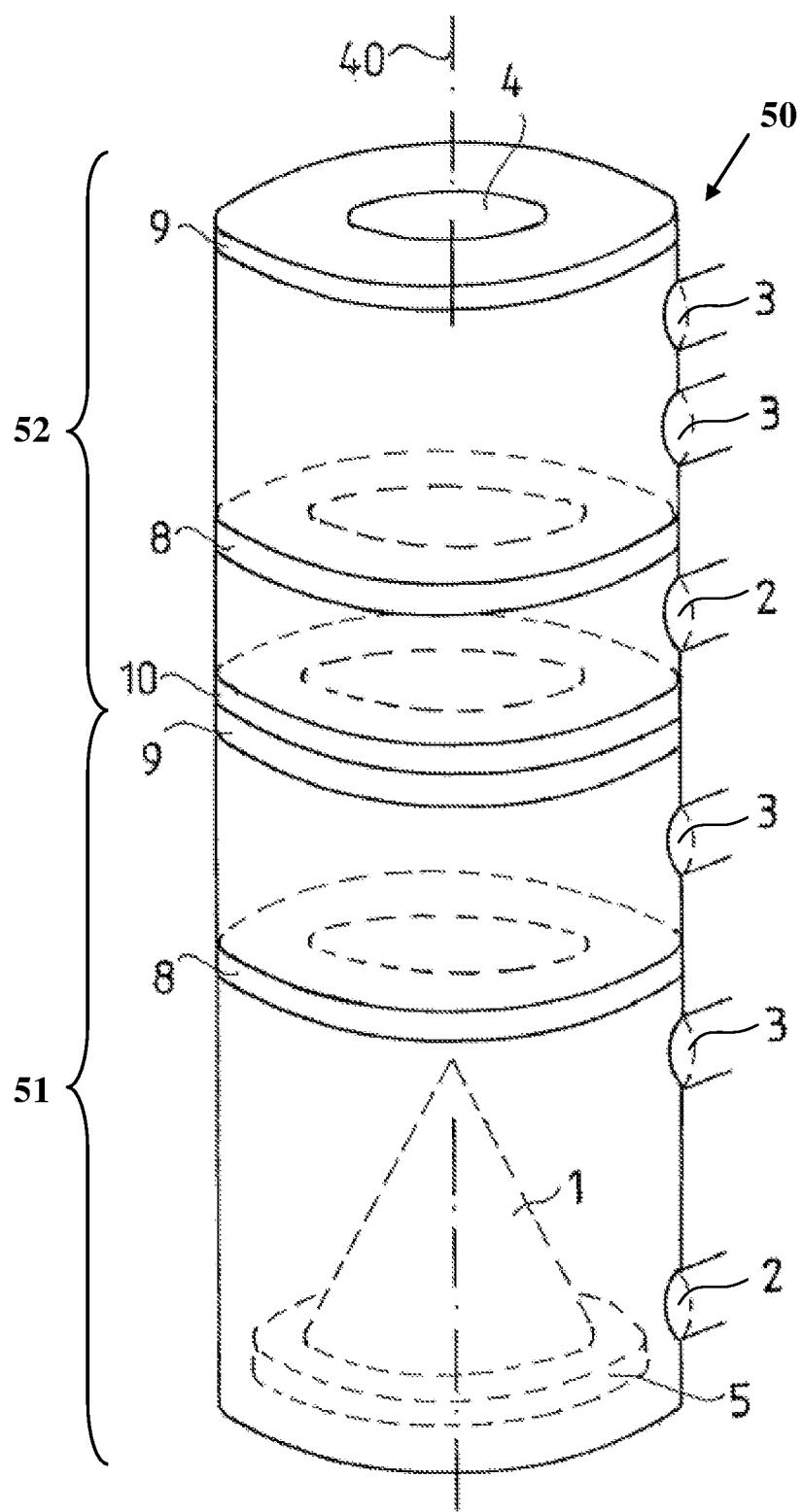
Figure 4:
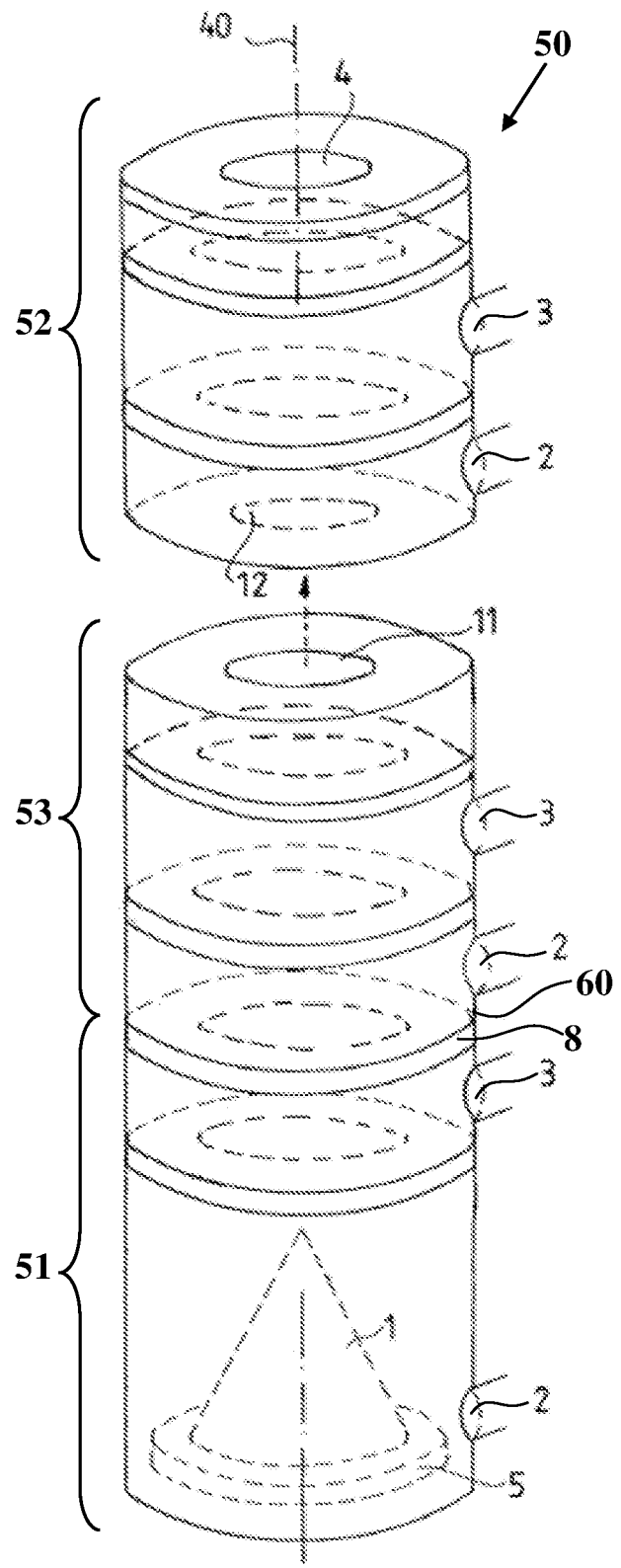

In what follows, the invention, especially preferred exemplary embodiments thereof are described in detail with reference to the accompanying drawings, wherein FIG. 1 shows the operation of an exemplary embodiment of the apparatus according to the invention in a perspective view schematically;

FIG. 2 shows the configuration of a preferred exemplary embodiment of the base magnet of the apparatus according to the invention;

FIG. 3 shows a preferred exemplary embodiment of the apparatus according to the invention schematically, wherein the housing is formed of two connected members; and FIG. 4 shows a preferred exemplary embodiment of the apparatus according to the invention schematically, wherein the housing comprises a bottom member, an intermediate member connected to the bottom member, and a top member separated from the intermediate member.

The apparatus 50 according to the invention shown in FIG. 1 comprises a cylindrical housing 6, inside which a cylindrical flow space is formed. Though the housing 6 shown in FIG. 1 is cylindrical, the invention is not limited to this shape, it may be any other elongated shape with either straight or curved centerline with any cross-section, furthermore the shape and size of the cross-section may also vary along the centerline. The housing 6 is preferably made of a magnetizable material, e.g. soft iron. The housing comprises a bottom wall 61, a top wall 62 and a sidewall 60 running around the circumference thereof. The top wall 62 in this embodiment is an annular exit magnet 9. In the embodiment shown in FIG. 1, an opening formed in the center of the annular exit magnet 9 is the outlet opening 4 of the apparatus 50. However, the outlet opening may also be formed in the center of a non-magnetic top wall 62 or in the sidewall 60. The magnets used in the apparatus are preferably permanent magnets, e.g. ferrite magnets or rare earth magnets (e.g. neodymium magnets), but the apparatus may also be implemented with electromagnets. The magnetic axes of the magnets are preferably parallel with the centerline of the housing.

In the embodiment according to FIG. 1, an inlet opening 2 is formed in the sidewall 60 of the housing 6, in the proximity of the bottom of the apparatus. An inlet tube 30 is connected to the inlet opening, through which a fluid enters the housing in a substantially tangential direction. Inlet openings 2, 3 may optionally be formed in the bottom wall 61 and top wall 62 of the housing; furthermore they can be formed in the sidewall 60 in a plurality of positions (i.e. heights) along the centerline.

The inlet tube 30 may be arranged entirely outside the housing 6 or may intrude into the housing 6. In the latter case, the portions of the inlet tubes 30 outside the housing are not necessarily tangential, but at their intruding portions at least in the proximity of their ends are tangential or are provided with an element which deflects the fluid to tangential direction. The element deflecting the fluid to tangential direction may also be formed as a component separate from the inlet tube.

As a result of the tangential supply, the fluid is moving on a circular path 7 while approaching the outlet opening 4 in the cylindrical space, i.e. the fluid is moving on an at least partially spiral or helical path 7. This ensures that the fluid crosses a large number of magnetic field lines in a direction forming a large angle with the field lines, while it is flowing through the apparatus in the magnetic field generated by the magnets arranged with their magnetic axes parallel with the centerline.

Inside the housing 6, the apparatus 50 comprises a conical body 1 in the proximity of the bottom of the housing 6, for reducing flow resistance (i.e. facilitating substantially laminar flow and avoiding cavitation), and for providing suitable distribution of magnetic field. In the embodiment according to FIG. 1, the conical body 1 is made of a magnetizable material, e.g. soft iron, and it is placed on a base magnet 5, comprising an annular permanent magnet 21. However, the combination of a conical body 1 made of magnetizable material and a base magnet 5 may be replaced with a conical body 1 formed as a single magnet. The housing 6 preferably comprises further annular magnets 8 at several positions (i.e. heights) along the centerline, with axes that locally coincide with the centerline. In the embodiment shown in FIG. 1, i.e. in the case of using a cylindrical housing 6, the planes of the annular magnets are parallel to the bottom wall 61 and the top wall 62 and the magnetic axes of the magnets are parallel with the centerline. The housing 6 further comprises further inlet openings 3 for ensuring the circular motion of the fluid farther away from the first inlet opening 2.

In the preferred embodiment shown in FIG. 1, the first inlet opening 2 and the further inlet openings 3 are arranged on the same line, i.e. they are arranged at the same circumferential position in the sidewall 60. This is not at all necessary, each inlet opening may be arranged at any arbitrary circumferential position. Furthermore each inlet opening 2, 3 and the inlet tubes 30 connected thereto are preferably oriented such that the fluid flow entering the housing is substantially tangential in the same sense of rotation as viewed from the direction of the centerline.

Selecting the sizes of the apparatus described above is an obvious task to a person skilled in the art based on the fluid to be treated and the flow conditions to be achieved, e.g. in the case of treating water, the diameter of the apparatus is preferably 10 to 100 mm, more preferably 20 to 80 mm, particularly 25 to 50 mm, e.g. 50 mm.

Sealing elements, preferably sealing rigs, particularly rubber rings are arranged between members connected to each other via screw threads such that the fluid to be treated does not contact the screw threads thus the sealing element also protects the screw threads from corrosion.

FIG. 2 shows a preferred embodiment of the base magnet 5, wherein the base magnet 5 comprises an annular magnet 21, a flux insulating layer 22 and a disc 23 optionally made of soft iron arranged in the middle of the annular magnet 21. However, the base magnet may be alternatively formed as a single magnetic disc.

FIG. 3 shows a further preferred embodiment of the apparatus according to the invention, wherein the housing 6 is formed by two connected members: a bottom member 51 and a top member 52. Identical reference numbers in FIGS. 1 and 3 indicate the same elements. Accordingly, the bottom member 51 comprises a bottom wall 61, a sidewall 60 connected to the bottom wall 61 and running around the circumference thereof, at least one inlet opening 2, 3 formed in the sidewall 60, at least one inlet opening 2, which is in the proximity of the bottom wall 61, a conical body 1 having a symmetry axis that is locally coincident with the centerline 40, i.e. it is locally tangential thereto, at least one magnet 8, and an exit surface 11 in a plane defined by a top edge of the sidewall 60. The top member 52 comprises a sidewall 60, a top wall 62 and an outlet opening 4 formed in the top wall 62, and optionally one or more further magnets 8 and one or more inlet openings 2,3. In the embodiment according to FIG. 3, the members are cylindrical and are connected to each other coaxially, in axial direction one after the other and in a sealed manner. However, it is hereby noted that non-cylindrical members may also be used with their centerlines defined by the bottom and top surface of the member and the centerlines of the connected members form a continuous curve (or straight line). The top end of the bottom member 51 and the bottom end of the top member 52 optionally comprise an element for the releasably connecting the two members, e.g. a screw thread (not indicated in the drawing). Preferably a sealing element, such as a sealing rubber ring (not indicated in the drawing) is arranged between the bottom member 51 and the top member 52 for preventing the fluid being treated within the housing from leaking out of the housing at the connection of the members. In a further preferred embodiment, the members are fastened to each other by threaded bolts parallel to the centerline and corresponding further threaded elements. The sealing element is preferably arranged so as to prevent the fluid being treated from contacting the connecting means (e.g. screw thread or threaded bolt).

In the embodiment shown in the Figure, the top wall of the bottom member 51 is formed by an annular exit magnet 9 and the bottom wall of the top member 52 is formed by an annular entry magnet 10, wherein the openings in the center of these annular magnets respectively form the exit surface 11 and the entry surface 12 of the corresponding members. In the embodiment shown in FIG. 3, the top member 52 also ends with an annular exit magnet 9, whose opening defines the outlet opening 4 of the apparatus 50. In a more preferred embodiment, the outlet opening 4 is formed in a cover comprising the top wall 62, which can be secured to the top of the housing 6 or to the top of the top member 52 via screw threads, furthermore the outlet opening 4 formed in the top wall 62 has a configuration and size according to the usual standards of the technical field of use, or an element (e.g. tube or connector) with such a configuration and size is secured thereto e.g. by welding. It is hereby noted, that arranging the annular magnets at the ends of the members is not necessary, the ends of the members may form the exit and entry surfaces in the whole surface surrounded by the sidewall 60, or these surfaces may have a cross-sectional area limited by partial closing walls, furthermore these may vary between two adjacent members.

FIG. 4 shows a further preferred embodiment of the apparatus according to the invention, wherein the housing 6 is formed by more than two members. In the Figure, the bottom member 51 is connected to an intermediate member 53, above which a top member 52 is shown. The intermediate member 53 comprises at least a sidewall 60, and preferably at least one magnet 8 and at least one inlet opening 2, 3 formed in the sidewall 60, as shown in the example according to FIG. 4, where the magnets are annular magnets and the housing 6 is substantially cylindrical. The intermediate member 53 has an entry surface and an exit surface at its bottom end and top end respectively. In FIG. 4 only a single intermediate member is shown, but practically any number of intermediate members 53 may be used, which are preferably of identical configuration, furthermore optionally the configuration of top member is also identical to the configuration of the intermediate members. In the embodiment shown in FIG. 4, the exit surface of the bottom member 51 is defined by an annular exit magnet 8, while the entry surface of the intermediate member is defined by the whole area surrounded by the sidewall 60, and the exit surface 11 of the intermediate member is limited (reduced) by a closing wall, and the entry surface of the top member is also limited by a closing wall. Identical reference numbers in FIGS. 1, 3 and 4 indicate the same elements.

The entry- and exit surfaces of the intermediate members 53 may be the whole area surrounded by the sidewall 60, or a portion thereof that is partially limited by a further wall or optionally by an annular magnet 8.

The inlet openings formed in the sidewall of the housing optionally comprise throttling means, particularly nozzles for increasing the flow velocity of the fluid entering the housing. The inlet openings and the inlet tubes connected thereto, and the optionally present throttling elements, nozzles, and/or further deflecting elements are arranged so as to guide the fluid flow entering the housing into a tangential direction.

The bottom wall 61 of the apparatus 50, i.e. the bottom wall 61 of the bottom member 51 is fixed to the sidewall 60 preferably by a permanent joint, particularly by welding. The top wall 62 of the apparatus 50, e.g. the top wall 62 of the top member 52 is secured to the sidewall 60 preferably by a releasable joint, particularly by screw threads.

The surfaces of the magnets in the apparatus optionally comprise recesses and/or protrusions, such as grooves and/or or ribs for increasing active surface, e.g. for treating gases.

The apparatus according to the invention is suitable for an improved extent magnetic treatment of any fluid, such as liquids and gases, e.g. flammable gases or liquids used as fuel or combustibles, or for the treatment of the oxidizer used therewith, or for the treatment of water used as drinking water, irrigation water or industrial water. A particularly preferable field of use of the apparatus is the treatment of irrigation water, especially in the proximity of the place of use so that the irrigation water retains the properties it obtained from the treatment until it is used.

The apparatus according to the invention optionally comprises one or more sensors connected to a network of devices (i.e. an internet of things, IoT) for carrying out internal measurements, e.g. for monitoring operation parameters, such as pressure, temperature, flow velocity, flow rate, magnetic field strength, or for detecting operation failures.

The permanent magnets in the apparatus are optionally arranged with identical polarities. In a further embodiment of the apparatus, at least two of the adjacent permanent magnets are arranged with opposite polarities, optionally each of the magnets are arranged with polarity opposing the polarities of each adjacent magnet.

In the present description the use of primarily annular and conical magnets is described, but naturally the invention may also be implemented with permanent magnets of shapes different therefrom or with electromagnets. The use of electromagnets has the advantage that the operation of the apparatus may be actively regulated both in the short and long term according to the desired extent of treatment and optionally on the basis of data provided by the sensors. A further option is to use a combination of permanent magnets and electromagnets, which provides the ability to compensate the partial demagnetization of the permanent magnets occurring over long periods of time.

For reducing the effect of sunlight irradiating the apparatus (either due to photoelectric effect or temperature increase), the apparatus is preferably provided with light protection coating, comprising one or more of a light absorbing layer and/or a light reflecting layer and/or a UV protection layer. The apparatus is preferably provided with a layer protecting against corrosion. In a further embodiment, the apparatus is provided with a casing for protection against light and corrosion.

Fixing and sealing solutions well known to a person skilled in the art, such as screw threads, fastening elements and sealing elements are not shown in the drawings, and the use of a solution different from the aforementioned examples does not yield a solution outside the scope of protection.

In the present description only a few preferred embodiments of the invention are described in detail according to the drawings. It is obvious to a person skilled in the art that numerous further variants of the apparatus may be implemented within the scope of protection defined by the claims.

The invention claimed is:

1. Apparatus (50) for magnetic treatment of fluids, comprising:
    a housing (6), comprising a bottom wall (61), a top wall (62), and a sidewall (60) running around the circumference of the bottom wall (61) and of the top wall (62) of the housing (6), wherein the housing (6) having a centerline (40) passing through the center of the bottom wall (61) and the center of the top wall (62);

at least one inlet opening (2, 3) and at least one outlet opening (4) formed in at least one wall (60, 61, 62) of the housing (6);

at least one magnet (8, 9, 10, 21) connected to the housing (6), wherein the magnetic field of the magnet at least partially intrudes into the housing (6);

one or more inlet tubes (30) connected to the at least one inlet opening (2, 3);

a conical body (1) with a broader end forming a base, said conical body (1) being arranged inside the housing (6) with said base, in the proximity of the bottom wall (61) or in contact with the bottom wall (61) of the housing (6);

at least one of the one or more inlet tubes (30) is substantially tangential to the sidewall (60) of the housing (6) in the proximity of one of the at least one inlet opening, characterized in that the conical body (1) is formed by a permanent magnet, or the conical body (1) is made of a magnetizable material and is placed on a base magnet (5) comprising at least one magnet (21).

2. Apparatus (50) according to claim 1, characterized in that at least one of the magnets is a permanent magnet.

3. Apparatus (50) according to claim 1, characterized in that at least one of the at least one inlet opening (2, 3) is formed in the sidewall (60) of the housing (6).

4. Apparatus (50) according to claim 3, characterized in that at least one of the at least one inlet opening (2, 3) is formed in the sidewall (60) of the housing, in the proximity of the bottom wall (61) of the housing.

5. Apparatus (50) according to claim 4, characterized in that the housing (6) is formed by at least two members (51, 52) in the direction of the centerline (40), which include a bottom member (51) and a top member (52), wherein the bottom member (51) comprises a bottom wall (61), a sidewall (60) fixed to the bottom wall (61) and running around the circumference of the bottom wall (61), the at least one inlet opening (2, 3) formed in the sidewall (60), wherein at least one of the at least one inlet opening (2, 3) is in the proximity of the bottom wall (61), the conical body (1) having a symmetry axis coincident with the centerline (40), at least one magnet (8) and at least one exit surface (11) in a plane defined by a top end of the sidewall (60);

the top member (52) comprises a sidewall (60), the top wall (62) and an outlet opening (4) formed in the top wall, wherein said top member (52) further comprises one or more magnets (8) and one or more inlet openings (2, 3).

6. Apparatus (50) according to claim 1, characterized in that the housing (6) is made of a magnetizable material.

7. Apparatus (50) according to claim 5, characterized in that at least one intermediate member (53) with top and bottom ends is arranged between the bottom member (51) and the top member (52), which comprises a sidewall (60), an entry surface (12) at the bottom of said sidewall (60), an exit surface (11) at the top of said sidewall (60), and at least one permanent magnet (8).

8. Apparatus (50) according to claim 7, characterized in that the intermediate member (53) further comprises one or more inlet openings (2, 3) formed in the sidewall (60).

9. Apparatus (50) according to claim 5, characterized in that a top end of the bottom member (51) and a bottom end of the top member (52) is releasably connected to each other forming a connection, the connection being sealed in such a way that fluid can flow between the bottom member (51) and the top member (52) only through the at least one exit surface and an entry surface in a plane defined by a bottom end of the top member.

10. Apparatus (50) according to claim 7, characterized in that the top end of the bottom member (51) is configured to be releasably connected to the bottom end of the top member (52) and/or of the intermediate member (53);

the bottom end of the top member (52) is configured to be releasably connected to the top end of the bottom member (51) and/or of the intermediate member (53);

the top end of the intermediate member (53) is configured to be releasably connected to the bottom end of the top member (52) and/or a bottom end of a further intermediate member (53);

the bottom end of the intermediate member (53) is configured to be releasably connected to the top end of the bottom member (51) and/or a top end of the further intermediate member (53).

11. Apparatus (50) according to claim 2, characterized in that the permanent magnets (8, 9, 10, 21) are formed by annular magnets.

12. Apparatus (50) according to claim 1, characterized in that a magnetic axis of at least one of the magnets (8, 9, 10, 21) is parallel with the centerline of the housing.

13. Apparatus (50) according to claim 1, characterized in that the housing (6) is formed as a substantially cylindrical housing.

* * * * *